US012638872B2

(12) United States Patent
Huang et al.

(10) Patent No.: US 12,638,872 B2
(45) Date of Patent: May 26, 2026

(54) FAST TRANSIENT LINEAR REGULATOR

(71) Applicant: Monolithic Power Systems, Inc., Kirkland, WA (US)

(72) Inventors: Po-Hsien Huang, New Taipei City (TW); Bor-Tsang Hwang, New Taipei City (TW); Yu-Huei Lee, New Taipei City (TW)

(73) Assignee: Monolithic Power Systems, Inc., Kirkland, WA (US)

( * ) Notice: Subject to any disclaimer, the term of this patent is extended or adjusted under 35 U.S.C. 154(b) by 217 days.

(21) Appl. No.: 18/648,086

(22) Filed: Apr. 26, 2024

(65) Prior Publication Data

US 2024/0361793 A1 Oct. 31, 2024

Related U.S. Application Data

(60) Provisional application No. 63/462,677, filed on Apr. 28, 2023.

(51) Int. Cl.
*G05F 1/565* (2006.01)
*G05F 1/575* (2006.01)

(52) U.S. Cl.
CPC .............. *G05F 1/575* (2013.01); *G05F 1/565* (2013.01)

(58) Field of Classification Search
CPC ................................ G05F 1/575; G05F 1/565
See application file for complete search history.

(56) References Cited

U.S. PATENT DOCUMENTS 7,723,968 B2 * 5/2010 Okuyama ............... G05F 1/575 323/275
9,501,075 B2 * 11/2016 Bisson .................... G05F 1/575
2011/0181259 A1 * 7/2011 Shen ....................... G05F 1/575 323/282
2021/0089068 A1 * 3/2021 Manohar ................... G05F 1/59
2023/0376062 A1 * 11/2023 Lei ............................ G05F 1/59

* cited by examiner

*Primary Examiner* — Adolf D Berhane
(74) *Attorney, Agent, or Firm* — Perkins Coie LLP

(57) ABSTRACT

A linear regulator includes a pass element, an error amplifier, and a miller compensation circuit. The error amplifier is configured to provide an error signal to the control terminal of the pass element in response to a reference voltage and a feedback voltage. The error amplifier includes a current mirror stage and a first stage. The current mirror stage is configured to receive the input voltage. The first stage is configured to provide a first current signal to a first terminal of the current mirror stage in response to the reference voltage, and provide a second current signal to a second terminal of the current mirror stage in response to the feedback voltage. The miller compensation circuit is coupled between the second terminal of the pass element and the error amplifier. The miller compensation circuit is configured to control the first current signal.

23 Claims, 5 Drawing Sheets

100

FAST TRANSIENT LINEAR REGULATOR

CROSS-REFERENCE TO RELATED APPLICATION(S)

The present application claims the benefit of and priority to a U.S. Provisional Patent Application Ser. 63/462,677 filed Apr. 28, 2023, which is hereby incorporated fully by reference into the present application.

TECHNICAL FIELD

The present disclosure relates generally to power circuits, and more particularly but not exclusively to linear regulator circuits.

BACKGROUND OF THE INVENTION

Linear regulator circuits such as low dropout (LDO) regulator circuits have been used in many applications. Typically, an LDO regulator circuit includes a pass element to connect between the input source and the output node. An error amplifier compares a reference voltage and the feedback signal and control the pass element to regulate the output voltage. Here, the LDO regulator circuit acts as a variable resistor to maintain output voltage level. The balance among parameters such as quiescent current, transient response, and the total occupied area are important for the LDO circuit design.

SUMMARY OF THE INVENTION

According to an embodiment of the present disclosure, a linear regulator circuit is provided. The linear regulator includes a pass element, an error amplifier, and a miller compensation circuit. The pass element has a first terminal, a second terminal and a control terminal. The first terminal of the pass element is configured to receive an input voltage, and the second terminal of the pass element is configured to provide an output voltage. The error amplifier is configured to provide an error signal to the control terminal of the pass element in response to a reference voltage and a feedback voltage representing the output voltage. The error amplifier includes a current mirror stage and a first stage. The current mirror stage is configured to receive the input voltage. The first stage is coupled to the current mirror stage. The first stage is configured to provide a first current signal to a first terminal of the current mirror stage in response to the reference voltage, and provide a second current signal to a second terminal of the current mirror stage in response to the feedback voltage. The miller compensation circuit is coupled between the second terminal of the pass element and the error amplifier. The miller compensation circuit is configured to control the first current signal.

According to another embodiment of the present disclosure, a linear regulator circuit is provided. The linear regulator includes a pass element, an error amplifier, and a buffer. The pass element has a first terminal, a second terminal and a control terminal. The first terminal of the pass element is configured to receive an input voltage, and the second terminal of the pass element is configured to provide an output voltage. The error amplifier is configured to provide an error signal in response to a reference voltage and a feedback voltage representing the output voltage. The buffer is configured to provide a control signal to the control terminal of the pass element in response to the error signal. The buffer includes a first transistor, a second transistor and a current source. The first transistor has a first terminal, a second terminal and a control terminal. The control terminal of the first transistor is configured to receive the error signal, and the first terminal of the first transistor is coupled to the control terminal of the pass element. The second transistor has a first terminal, a second terminal and a control terminal. The control terminal of the second transistor is coupled to the second terminal of the first transistor, and the second terminal of the second transistor is coupled to the control terminal of the pass element. The current source is coupled in series with the first transistor, and is configured to provide a current signal to the first transistor.

According to yet another embodiment of the present disclosure, a linear regulator circuit is provided. The linear regulator includes a pass element, an error amplifier, a buffer, a feed-forward loading stage, and a miller compensation circuit. The pass element has a first terminal, a second terminal and a control terminal. The first terminal of the pass element is configured to receive an input voltage, and the second terminal of the pass element is configured to provide an output voltage. The error amplifier includes a differential pair configured to provide a first current signal at a first output terminal in response to a reference voltage and provide a second current signal at a second output terminal in response to a feedback voltage representing the output voltage. The error amplifier is configured to provide an error signal in response to the reference voltage and the feedback voltage. The buffer is configured to provide a control signal to the control terminal of the pass element in response to the error signal. The feed-forward loading stage is coupled between the error amplifier and the second terminal of the pass element. The feed-forward loading stage is configured to adjust a loading current of the pass element. The miller compensation circuit is coupled between the second terminal of the pass element and the error amplifier. The pass element is controlled in response to the control signal via a first feedback path. The first feedback path starts from the second current signal flowing through the second output terminal of the differential pair, through a second current mirror coupled to the second output terminal of the differential pair, and through the buffer to the control terminal of the pass element.

BRIEF DESCRIPTION OF THE DRAWINGS

The present disclosure can be further understood with reference to the following detailed description and appended drawings, where like elements are provided with like reference numerals. These drawings are only for illustration purpose, thus may only show part of the devices and are not necessarily drawn to scale.

DETAILED DESCRIPTION

Various embodiments of the present disclosure will now be described. In the following description, some specific details, such as example circuits and example values for these circuit components, are included to provide a thorough understanding of embodiments. One skilled in the relevant art will recognize, however, that the present disclosure can be practiced without one or more specific details, or with other methods, components, materials, etc. In other instances, well-known structures, materials, processes or operations are not shown or described in detail to avoid obscuring aspects of the present disclosure.

Throughout the specification and claims, the phrases "in one embodiment", "in some embodiments", "in one implementation", and "in some implementations" as used includes both combinations and sub-combinations of various features described herein as well as variations and modifications thereof. These phrases used herein do not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
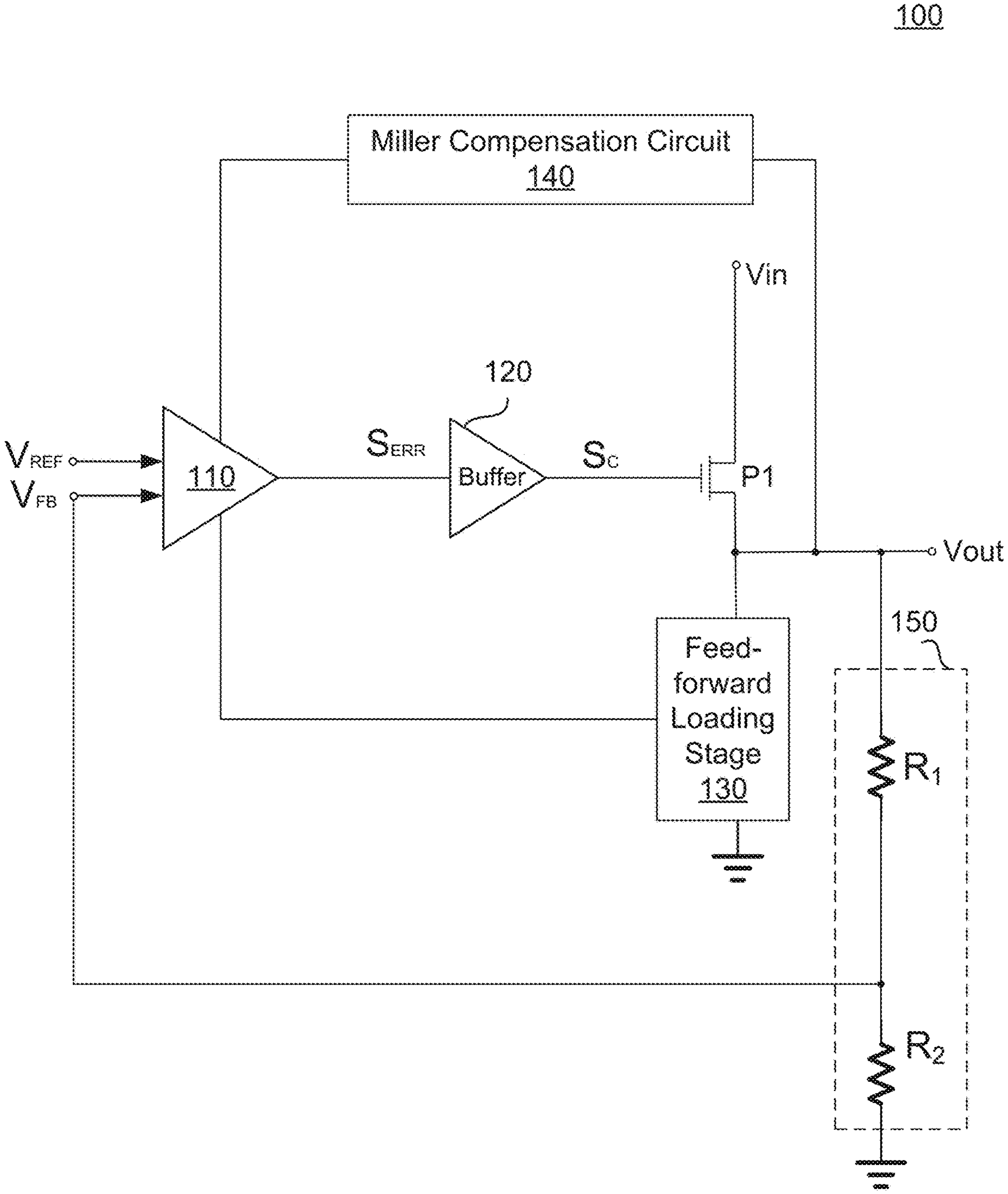
FIG. 1 is a schematic block diagram of an LDO circuit in accordance with an embodiment of the present disclosure.

FIG. 1 is a schematic block diagram of an LDO circuit 100 in accordance with an embodiment of the present disclosure. The LDO circuit 100 includes an error amplifier 110, a pass element P1 and a feedback circuit 150. The pass element P1 is coupled between an input node Vin and an output node Vout. The error amplifier 110 is configured to receive a reference voltage $V_{REF}$ and a feedback voltage $V_{FB}$ representing the output voltage at the output node Vout, and provide an error signal $S_{ERR}$ to the control terminal (e.g., gate) of the pass element P1 in response to the reference voltage $V_{REF}$ and the feedback voltage $V_{FB}$.

In one embodiment, the LDO circuit 100 further includes a buffer 120. The buffer 120 is coupled to the error amplifier 110. The buffer 120 is configured to receive the error signal $S_{ERR}$, and provide a control signal Sc to the control terminal (e.g., gate) of the pass element P1 in response to the error signal $S_{ERR}$.

In another embodiment, the LDO circuit 100 further includes a feed-forward loading stage 130. The feed-forward loading stage 130 is coupled between the output node Vout and the error amplifier 110. The feed-forward loading stage 130 is configured to adjust a loading current of the pass element P1 to enhance the transient response. When the transient event happens, the feed-forward stage 130 increases or decreases the loading current based on the information from the error amplifier 110 to stabilize the output voltage at the output node Vout.

In some embodiments, the LDO circuit 100 further includes a miller compensation circuit 140. The miller compensation circuit 140 is configured to provide miller compensation between the error amplifier 110 and the output node Vout. In one embodiment, the miller compensation circuit 140 is coupled to the reference voltage $V_{REF}$ side of the error amplifier 110.

Figure 2:
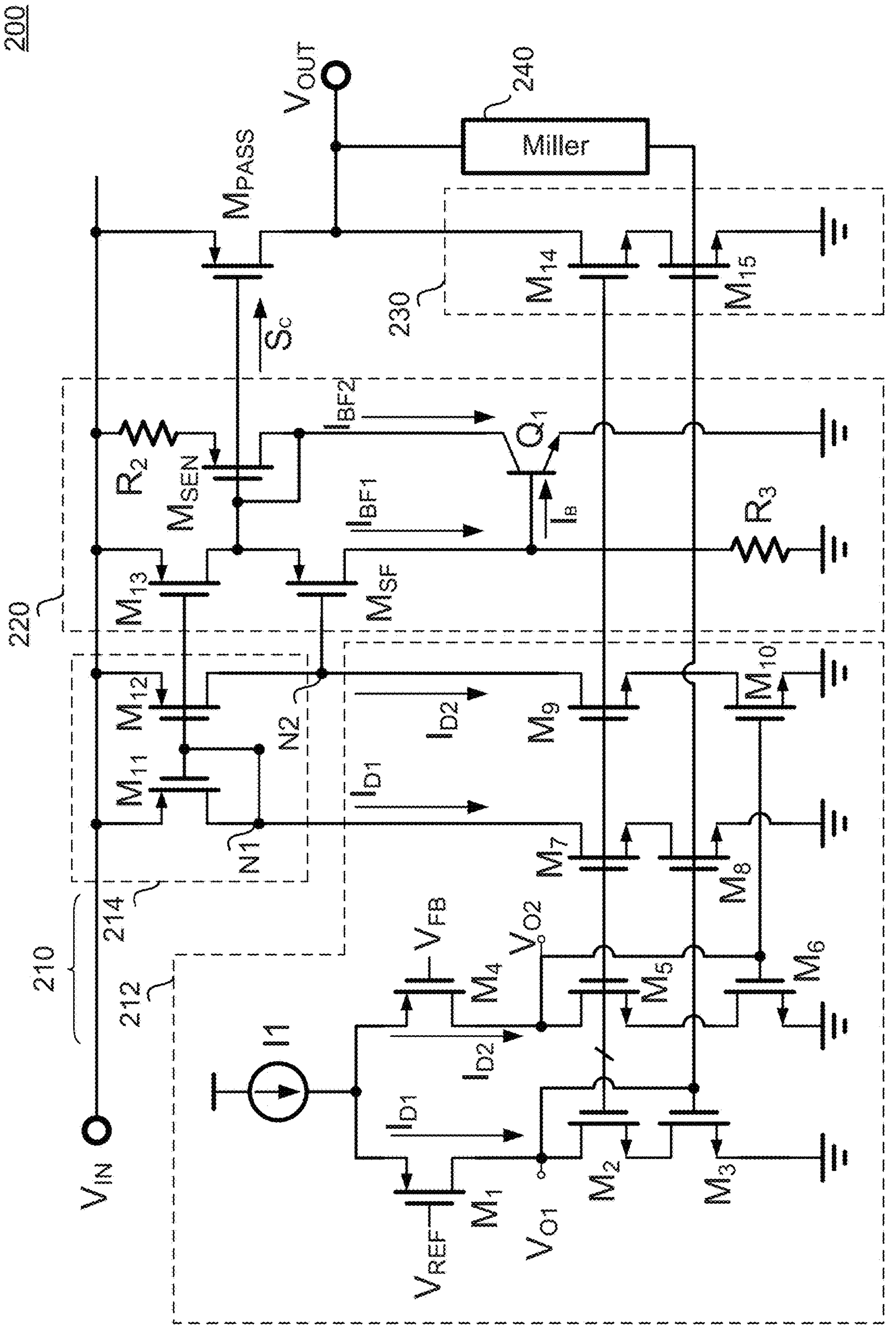
FIG. 2 is a schematic circuit diagram of an LDO circuit in accordance with an embodiment of the present disclosure.

FIG. 2 is a schematic circuit diagram of an LDO circuit 200 in accordance with an embodiment of the present disclosure. The LDO circuit 200 includes an error amplifier 210, a buffer 220, a feed-forward loading stage 230, a miller compensation circuit 240, and a pass element $M_{PASS}$. In this embodiment, the error amplifier includes a first stage 212 and a current mirror stage 214. The first stage is configured to provide a first current signal $I_{D1}$ to a first terminal N1 of the current mirror stage 214 in response to the reference voltage $V_{REF}$, and provide a second current signal $I_{D2}$ to a second terminal N2 of the current mirror stage 214 in response to the feedback voltage $V_{FB}$.

For instance, the first stage 212 includes transistors $M_1$-$M_{10}$ and a current source I1 as shown in FIG. 1. A differential pair includes the transistors $M_1$ and $M_4$. The control terminal of the transistor $M_1$ forms the negative input terminal of the error amplifier 210 to receive the reference voltage $V_{REF}$, and the control terminal of the transistor $M_4$ forms the positive input terminal of the error amplifier 210 to receive the feedback voltage $V_{FB}$. The transistors $M_2$ and $M_3$ are coupled in series with the transistor $M_1$, and the transistors $M_5$ and $M_6$ are coupled in series with the transistor $M_4$. The first terminal (e.g., source) of the transistor $M_2$ is coupled to the second terminal (e.g., drain) of the transistor $M_3$. The second terminal (e.g., drain) of the transistor $M_2$ is coupled to the control terminal of the transistor $M_3$, and the control terminal (e.g., gate) of the transistor $M_2$ is coupled to the control terminal (e.g., gate) of the transistor $M_5$. The first terminal (e.g., source) of the transistor $M_5$ is coupled to the second terminal (e.g., drain) of the transistor $M_6$. The second terminal (e.g., drain) of the transistor $M_5$ is coupled to the control terminal of the transistor $M_6$. The transistors $M_2$, $M_3$, $M_7$, and $M_8$ form a current mirror. Specifically, the current mirror copies the current flowing through the transistor $M_1$ (i.e., the first current signal $I_{D1}$) at a first output terminal (e.g., $V_{O1}$) of the differential pair and provides the first current signal $I_{D1}$ to a first terminal N1 of the current mirror stage 214. Similarly, the transistors $M_5$, $M_6$, $M_9$, and $M_{10}$ form a current mirror to provide the current flowing through the transistor $M_4$ (i.e., the second current signal $I_{D2}$) to a second terminal N2 of the current mirror stage 214. It should be noted that the current gain of the current mirror, that is, the ratio of the output current to the input current is ideally equal to 1. However, in some implementations, the ratio could be adjusted and determined by the width-length ratio of the transistors.

The current mirror stage 214 is implemented by two transistors $M_{11}$ and $M_{12}$. The transistors $M_7$ and $M_8$ are coupled in series with the transistor $M_{11}$, and the transistors $M_9$ and $M_{10}$ are coupled in series with the transistor $M_{12}$. In one embodiment, the pass element $M_{PASS}$ is a P-type Metal-Oxide-Semiconductor Field-Effect Transistor (i.e., PMOS). In one implementation, the current mirror stage 214 is realized by the PMOS (i.e., $M_{11}$ and $M_{12}$) and is configured to receive the input voltage $V_{IN}$.

In one embodiment, the buffer 220 includes a first amplifier. The first amplifier serves as a source follower configured to buffer an input voltage and provide a lower impedance voltage. The first amplifier includes a transistor $M_{SF}$. The transistor $M_{SF}$ is configured to receive the error signal (e.g., the voltage signal at the second terminal N2 of the current mirror stage 214), and provide a control signal Sc to the control terminal of the pass element $M_{PASS}$. The second terminal N2 of the current mirror stage 214 is the push-pull output coupled to the control terminal (e.g., gate) of the transistor $M_{SF}$ to control the buffer 220. In one embodiment, a bipolar junction transistor (BJT) Q1 provides a feedback loop to further reduce the output impedance. Specifically, the control terminal (e.g., base) of the BJT Q1 is coupled to the second terminal (e.g., drain) of the transistor $M_{SF}$, and the second terminal (e.g., collector) of the BJT Q1 is coupled to the control terminal (e.g., gate) of the pass element $M_{PASS}$. In response to the current signal $I_B$ (i.e., the base current of the BJT Q1), the output impedance can be further reduced by (1+β) times. It should be noted that, in some embodiments, the bipolar junction transistor (BJT) Q1 may be replaced by a MOSFET.

In one implementation, the first amplifier of the buffer 220 further includes a current source, coupled in series with the transistor $M_{SF}$. The current source is configured to provide a current signal to the transistor $M_{SF}$. In one embodiment, the current source is realized by the transistor $M_{13}$. The transistors $M_{13}$ and $M_{SF}$ are coupled in series, and the transistors $M_{11}$ and $M_{13}$ form a PMOS mirror to set the minimum operating current $I_{BF1}$ for the buffer 220. The control terminal (e.g., gate) of the transistor $M_{SF}$ is coupled to the second terminal (e.g., drain) of the transistor $M_{12}$, and the second terminal (e.g., drain) of the transistor $M_{SF}$ is coupled to the control terminal (e.g., base) of the BJT $Q_1$. With proper biasing scheme, the biasing current set by the PMOS mirror guarantees the BJT $Q_1$ performance and avoids the BJT $Q_1$ working at low-beta region. Moreover, the transistor $M_{13}$ further improves the transient performance. Specifically, when a transient event occurs, for example, from heavy load to light load, the output voltage increases. Therefore, the current flowing through the transistor $M_4$ (i.e., the second current signal $I_{D2}$) decreases as the feedback voltage $V_{FB}$ increases, and thus the gate voltage of the transistor $M_{SF}$ also increases. Meanwhile, the current flowing through the transistor $M_1$ (i.e., the first current signal $I_{D1}$) increases, and therefore the biasing current of the transistor $M_{13}$ also increases. As a result, the gate voltage of the pass element $M_{PASS}$ also increases to make the output voltage at the output node $V_{OUT}$ return to the target value.

In one implementation, the buffer 220 further includes a sensing transistor $M_{SEN}$. The sensing transistor $M_{SEN}$ is coupled in series with the BJT $Q_1$. The control terminal (e.g., gate) of the transistor $M_{SEN}$ is coupled to the first terminal (e.g., source) of the transistor $M_{SF}$, the second terminal (e.g., drain) of the transistor $M_{SEN}$, and the control terminal (e.g., gate) of the pass element $M_{PASS}$. The sensing transistor $M_{SEN}$ is configured to monitor the operating condition (e.g., a loading current) of the pass element $M_{PASS}$. The biasing current $I_{BF2}$ of the buffer 220 may be automatically adjusted with the transistor $M_{SEN}$.

In one embodiment, the buffer 220 further includes a resistor $R_2$ coupled in series with the transistor $M_{SEN}$ to limit the biasing current $I_{BF2}$ at light load. In another embodiment, the buffer 220 further includes a resistor $R_3$ coupled in series with the transistor $M_{SF}$ to pull down the voltage level of the base of the BJT $Q_1$ for shutdown (standby) mode. That is, the BJT $Q_1$ is turned off. On the other hand, under light load condition, the BJT $Q_1$ is controlled to minimize the operating current, according to the operating current $I_{BF1}$, to achieve low quiescent current.

The feed-forward loading stage 230 includes a transistor (e.g., transistors $M_{14}$ and $M_{15}$). The transistors $M_{14}$ and $M_{15}$ are coupled in series with the pass element $M_{PASS}$. The control terminal (e.g., gate) of the transistor $M_{14}$ is coupled to the control terminal (e.g., gate) of the transistor $M_2$, and the control terminal (e.g., gate) of the transistor $M_{15}$ is coupled to the control terminal (e.g., gate) of the transistor $M_3$, and the second terminal (e.g., drain) of the transistor $M_2$. The transistors $M_2$, $M_3$, $M_{14}$, and $M_{15}$ form a current mirror to copy the current flowing through the transistor $M_1$ (i.e., the first current signal $I_{D1}$) and provide the loading current of the pass element $M_{PASS}$. That is, the feed-forward loading stage 230 is configured to adjust the loading current of the pass element $M_{PASS}$ in response to information from the error amplifier 210. Specifically, when a transient event occurs, for example, from light load to heavy load, the output voltage drops. Therefore, the current flowing through the transistor $M_4$ (i.e., the second current signal $I_{D2}$) increases as the feedback voltage $V_{FB}$ decreases, and thus the current flowing through the transistor $M_1$ (i.e., the first current signal $I_{D1}$) decreases. As a result, the current flowing through the transistors $M_{14}$ and $M_{15}$ also decreases such that the output voltage at the output node $V_{OUT}$ can return to the target value easier and faster. Furthermore, the feed-forward loading stage 230 is further configured to avoid the pass element $M_{PASS}$ to enter the fully off state during light load condition. This further minimizes the voltage dip when transient event happens, such as the high-frequency, periodic, and/or burst-type current profiles.

As shown in FIG. 2, the miller compensation circuit 240 is coupled between the error amplifier 210 on the $V_{REF}$ side and the output node $V_{OUT}$. In one embodiment, the miller compensation circuit 240 includes a capacitor. Specifically, a first terminal of the capacitor is coupled to the first output terminal (e.g., $V_{O1}$) of the differential pair, which is the second terminal (e.g., drain) of the transistor $M_2$ and the control terminal (e.g., gate) of the transistor $M_3$. If there's any voltage change on the $V_{OUT}$ node, the miller capacitor passes the fluctuation directly to the feed-forward loading stage 230. Thus, the loading current will be adjusted right immediately to against the change. Moreover, the main signal path (i.e., the feedback path) starts from the second current signal $I_{D2}$ flowing through the second output terminal (e.g., $V_{O2}$) of the differential pair, through the current mirror for copying the second current signal $I_{D2}$ and providing it to the second terminal N2 of the current mirror stage 214, to the control terminal of the pass element $M_{PASS}$ through the transistor $M_{SF}$. We can find the feedback path now is free from the delay caused by charging and discharging the miller capacitor. Therefore, the slew rate will be faster than the conventional design. The error signal generated by the error amplifier 210 could be passed to the buffer 220 much faster and timely. Combine the two advantages above, the transient response can be extremely fast to overcome any change at the output node $V_{OUT}$.

Figure 3:
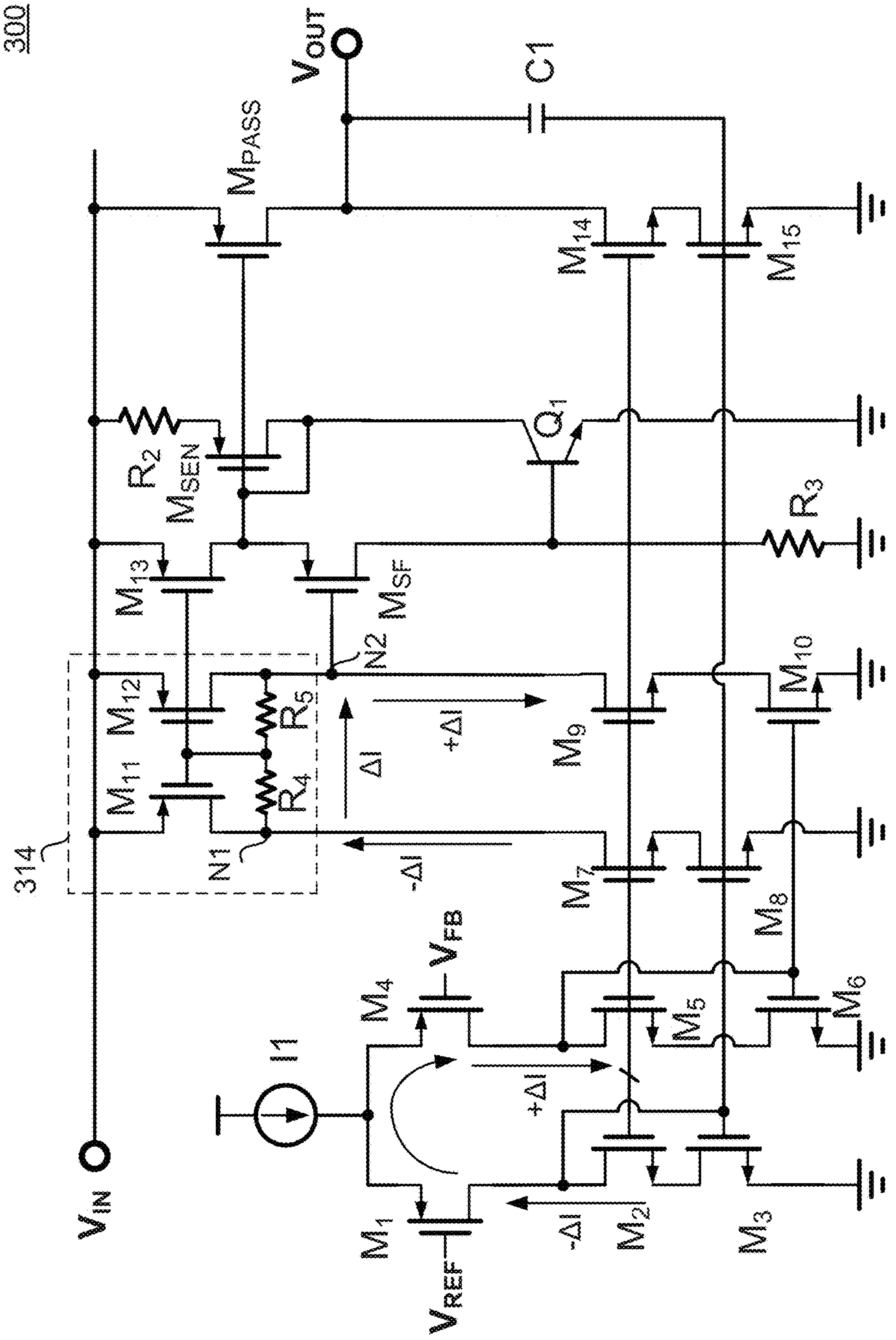
FIG. 3 is a schematic circuit diagram of an LDO circuit in accordance with another embodiment of the present disclosure.

FIG. 3 is a schematic circuit diagram of an LDO circuit 300 in accordance with another embodiment of the present disclosure. In one embodiment, the current mirror stage 214 as shown in FIG. 2 is replaced by the improved current mirror 314 as shown in FIG. 3. The current mirror 314 further includes resistors $R_4$ and $R_5$. The resistors $R_4$ is coupled between the first terminal (e.g., drain) of the transistor $M_{11}$ and the control terminal (e.g., gate) of the transistor $M_{11}$. The resistors $R_5$ is coupled between the first terminal (e.g., drain) of the transistor $M_{12}$ and the control terminal (e.g., gate) of the transistor $M_{12}$. The second terminal (e.g., source) of the transistor $M_{11}$ and the second terminal (e.g., source) of the transistor $M_{12}$ are coupled together to receive the input voltage $V_{IN}$. The two resistors $R_4$ and $R_5$ connected to the both sides are used to bypass the huge gate capacitance during the transient event.

Specifically, when the output voltage at the output node $V_{OUT}$ drops as the load current increases, the current flowing through the transistor $M_4$ increases (e.g., the second current signal $I_{D2}$+ΔI), and thus the current flowing through the transistor $M_1$ decreases (e.g., the first current signal $I_{D1}$−ΔI). Accordingly, the second current signal $I_{D2}$ provided to the second terminal N2 of the current mirror stage 314 also increases (e.g., $I_{D2}$+ΔI) and the first current signal $I_{D1}$ provided to a first terminal N1 of the current mirror stage 314 decreases (e.g., $I_{D1}-\Delta I$). As a result, the current $\Delta I$ flows through the resistors $R_4$ and $R_5$. For a conventional current mirror, the current flowing through the transistor is controlled by the gate voltage, and therefore the transient response is slow due to charging and discharging the gate capacitance (e.g., the gate to source capacitance $C_{GS}$). With the two resistors $R_4$ and $R_5$, the current $\Delta I$ flows through the resistors $R_4$ and $R_5$ without charging the gate capacitor, and the error signal generated by the error amplifier may be passed to the buffer quickly. Therefore, faster transient performance could be achieved.

Meanwhile, when the output voltage at the output node $V_{OUT}$ drops, the other terminal of the miller compensation circuit (e.g., a capacitor C1) that is connected to the control terminal of the transistors $M_3$, $M_8$, and $M_{15}$ also drops. In other words, the feed-forward loading stage (e.g., transistors $M_{14}$ and $M_{15}$) now draws less loading current from the output node $V_{OUT}$. Since the second current signal $I_{D2}$ provided to the second terminal N2 of the current mirror stage 314 increases (e.g., $I_{D2}+\Delta I$), the voltage level at the second terminal N2 of the current mirror stage 314 decreases, and therefore the transistor $M_{SF}$ draws more current and the pass element $M_{PASS}$ also draws more current. The voltage level of the control terminal (e.g., gate) of the pass element $M_{PASS}$ will decrease. As a result, the pass element $M_{PASS}$ provides more current to the output node $V_{OUT}$. With the two mechanism described above, fast transient response can be achieved.

Figure 4:
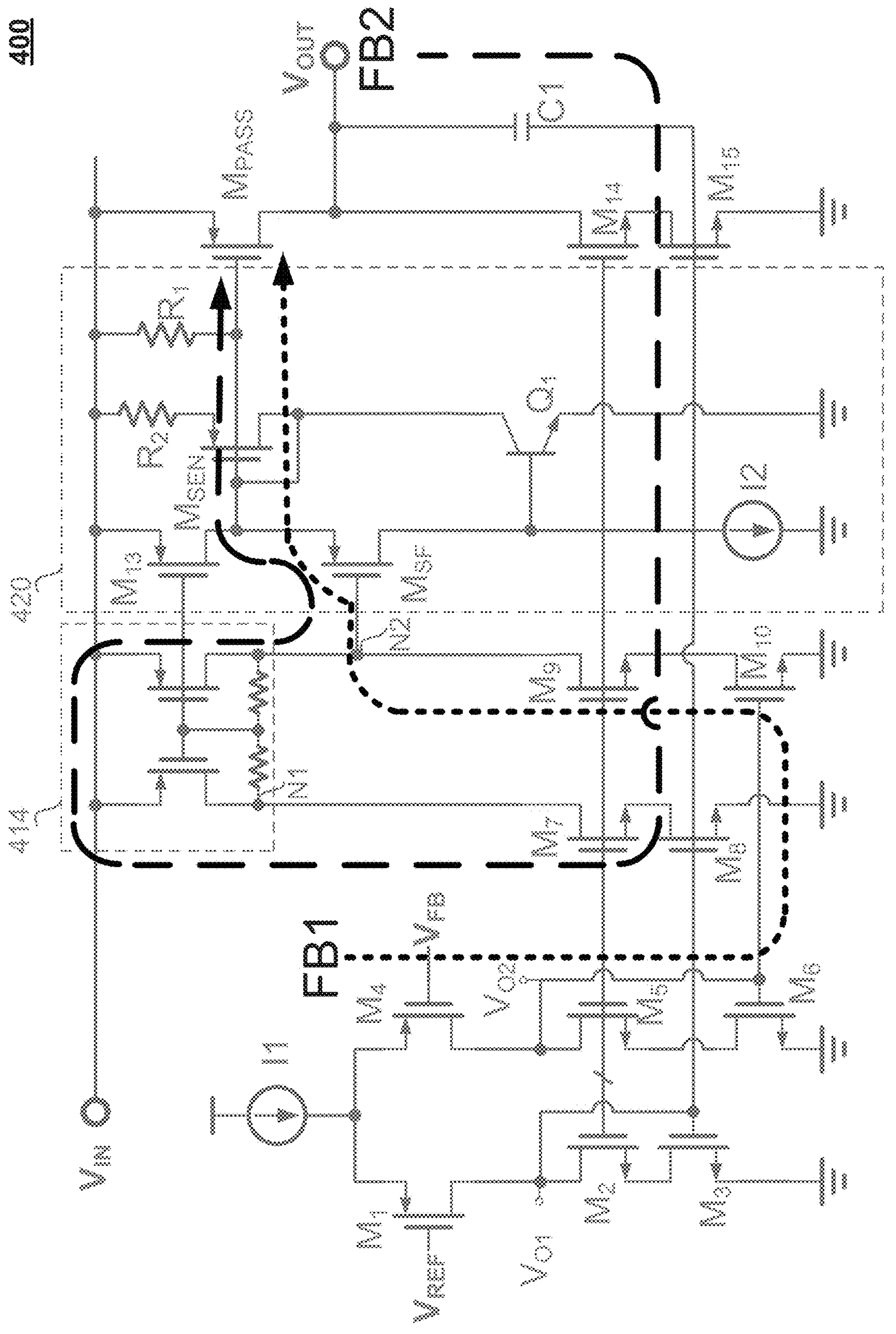
FIG. 4 is a schematic circuit diagram of an LDO circuit in accordance with yet another embodiment of the present disclosure.

FIG. 4 is a schematic circuit diagram of an LDO circuit 400 in accordance with yet another embodiment of the present disclosure. As shown in FIG. 4, there are two feedback path to control the pass element $M_{PASS}$. The first feedback path FB1 starts from the differential pair of the error amplifier. Specifically, in response to the feedback voltage, the transistor $M_4$ provides the second current signal flowing through the second output terminal $V_{O2}$ of the differential pair, and the second current signal is copied and provided to the second terminal N2 of the current mirror stage 414 through a second current mirror (e.g., formed by transistors $M_5$, $M_6$, $M_9$, and $M_{10}$), and then the first feedback path FB1 passes through the buffer (via the transistor $M_{SF}$) to the control terminal of the pass element $M_{PASS}$. On the other hand, the second feedback path FB2 starts from the output node Vout through the capacitor C1 to the control terminal of the transistor $M_8$ to provide the first current signal via the first current mirror (e.g., formed by transistors $M_2$, $M_3$, $M_7$, and $M_8$), and the first current signal is copied at the first terminal N1 of the current mirror stage 414 and provided to the second terminal N2 of the current mirror stage 414, and through the buffer to the control terminal of the pass element $M_{PASS}$.

In one embodiment, the resistor $R_3$ of the buffer 220 as shown in FIG. 2 is replaced by the reference current source I2. The reference current source I2 is coupled to a control terminal of the transistor Q1 to minimize the operating current of BJT Q1.

In another embodiment, the buffer circuit 420 further includes a resistor $R_1$ configured to pull up the gate of the transistor $M_{SEN}$ for shutdown (standby) mode. That is, the transistor $M_{SEN}$ is turned off to achieve low quiescent current.

Figure 5:
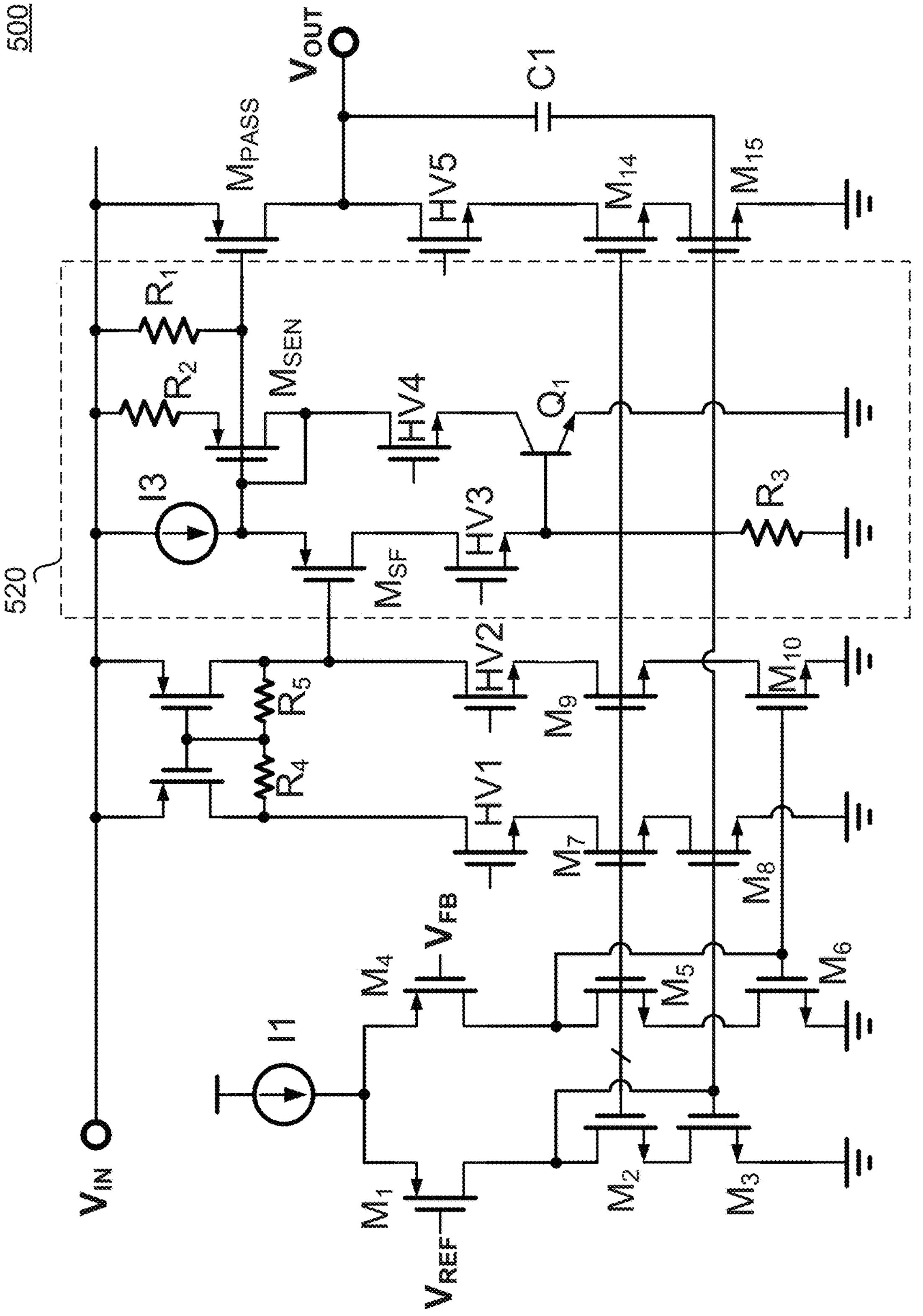
FIG. 5 is a schematic circuit diagram of an LDO circuit in accordance with yet another embodiment of the present disclosure.

FIG. 5 is a schematic circuit diagram of an LDO circuit 500 in accordance with yet another embodiment of the present disclosure. In one embodiment, the transistor $M_{13}$ of the buffer 220 as shown in FIG. 2 is replaced by the current source I3. The current source I3 is configured to provide a current signal to the transistor $M_{SF}$.

In another embodiment, the LDO circuit 500 further includes high voltage switches HV1, HV2, HV3, HV4 and HV5 to withstand high voltage.

It should be understood that, the control circuit and the related components, circuit structures, signals, and waveforms described or shown above in the present disclosure are only for illustration purpose. However, the present disclosure is not limited thereto. Persons having ordinary skill in the art may understood that the control circuit of the present disclosure could be realized, according to practical applications, by any other circuits with different circuit structures, and thus controlled by different types of the corresponding signals to achieve the corresponding functions. For example, the compensation circuit, the ramp generation circuit, the comparison circuit and the logic circuit could be realized by a digital circuit, an analog circuit, a software, an automatic generation circuit by hardware description language, or a combination of the above.

It will be appreciated by persons skilled in the art that the present disclosure is not limited to what has been particularly shown and described herein above. Rather the scope of the present disclosure is defined by the claims and includes both combinations and sub-combinations of the various features described hereinabove as well as variations and modifications thereof which would occur to persons skilled in the art upon reading the foregoing description and which are not in the prior art.

What is claimed is:

1. A linear regulator circuit, comprising:

a pass element having a first terminal, a second terminal and a control terminal, wherein the first terminal of the pass element is configured to receive an input voltage, and the second terminal of the pass element is configured to provide an output voltage;

an error amplifier configured to provide an error signal to the control terminal of the pass element in response to a reference voltage and a feedback voltage representing the output voltage, wherein the error amplifier comprises:

a current mirror stage; and a first stage coupled to the current mirror stage, wherein the first stage is configured to provide a first current signal to a first terminal of the current mirror stage in response to the reference voltage, and provide a second current signal to a second terminal of the current mirror stage in response to the feedback voltage;

a miller compensation circuit coupled between the second terminal of the pass element and the error amplifier, wherein the miller compensation circuit is configured to control the first current signal.

2. The linear regulator circuit of claim 1, wherein the first stage comprises:

a differential pair configured to receive the reference voltage and the feedback voltage;

a first current mirror coupled to a first output terminal of the differential pair and the first terminal of the current mirror stage; and a second current mirror coupled to a second output terminal of the differential pair and the second terminal of the current mirror stage.

3. The linear regulator circuit of claim 1, wherein the current mirror stage comprises:

a current mirror circuit having a first transistor and a second transistor;

a first resistor coupled between a control terminal of the first transistor and a first terminal of the first transistor; and a second resistor coupled between a control terminal of the second transistor and a first terminal of the second transistor.

4. The linear regulator circuit of claim 1, further comprises:

a buffer coupled between an output terminal of the error amplifier and the control terminal of the pass element.

5. The linear regulator circuit of claim 4, wherein the buffer comprises:

a first amplifier configured to provide a control signal to the control terminal of the pass element in response to the error signal from the current mirror stage; and a transistor having a first terminal, a second terminal and a control terminal, wherein the control terminal of the transistor is coupled to the first amplifier, and the second terminal of the transistor is coupled to the control terminal of the pass element.

6. The linear regulator circuit of claim 4, wherein the buffer comprises:

a sensing transistor configured to sense a loading current of the pass element, and adjusting a biasing current.

7. The linear regulator circuit of claim 1, further comprises:

a feed-forward loading stage coupled between the error amplifier and the second terminal of the pass element, and configured to adjust a loading current of the pass element in response to the first current signal.

8. The linear regulator circuit of claim 7, wherein the feed-forward loading stage comprises:

a transistor coupled in series with the pass element.

9. A linear regulator circuit, comprising:

a pass element having a first terminal, a second terminal and a control terminal, wherein the first terminal of the pass element is configured to receive an input voltage, and the second terminal of the pass element is configured to provide an output voltage;

an error amplifier configured to provide an error signal in response to a reference voltage and a feedback voltage representing the output voltage; and a buffer configured to provide a control signal to the control terminal of the pass element in response to the error signal, wherein the buffer comprises:

a first transistor having a first terminal, a second terminal and a control terminal, wherein the control terminal of the first transistor is configured to receive the error signal, and the first terminal of the first transistor is coupled to the control terminal of the pass element;

a second transistor having a first terminal, a second terminal and a control terminal, wherein the control terminal of the second transistor is coupled to the second terminal of the first transistor, and the second terminal of the second transistor is coupled to the control terminal of the pass element; and a current source, coupled in series with the first transistor, configured to provide a current signal to the first transistor.

10. The linear regulator circuit of claim 9, wherein the current source comprises:

a third transistor configured to set an operating current for the buffer.

11. The linear regulator circuit of claim 9, wherein the buffer further comprises:

a sensing transistor configured to sense a loading current of the pass element, and adjust a biasing current of the second transistor.

12. The linear regulator circuit of claim 11, wherein the buffer further comprises:

a first resistor coupled in series with the sensing transistor.

13. The linear regulator circuit of claim 11, wherein the buffer further comprises:

a second resistor coupled to a control terminal of the sensing transistor.

14. The linear regulator circuit of claim 9, wherein the buffer further comprises:

a third resistor coupled to a control terminal of the second transistor.

15. The linear regulator circuit of claim 9, wherein the buffer further comprises:

a reference current source coupled to a control terminal of the second transistor.

16. The linear regulator circuit of claim 9, wherein the error amplifier comprises:

a current mirror stage configured to receive the input voltage; and a first stage coupled to the current mirror stage, wherein the first stage is configured to provide a first current signal to a first terminal of the current mirror stage in response to the reference voltage, and provide a second current signal to a second terminal of the current mirror stage in response to the feedback voltage;

wherein the buffer further comprises:

a third transistor coupled in series with the first transistor, wherein a control terminal of the third transistor is coupled to the first terminal of the current mirror stage, wherein third transistor is configured to provide a current signal to the first transistor in response to the first current signal.

17. The linear regulator circuit of claim 16, further comprises:

a miller compensation circuit coupled between the second terminal of the pass element and the error amplifier, wherein the miller compensation circuit is configured to control the first current signal.

18. The linear regulator circuit of claim 9, further comprises:

a feed-forward loading stage coupled between the error amplifier and the second terminal of the pass element, and configured to adjust a loading current of the pass element in response to the first current signal.

19. A linear regulator circuit, comprises:

a pass element having a first terminal, a second terminal and a control terminal, wherein the first terminal of the pass element is configured to receive an input voltage, and the second terminal of the pass element is configured to provide an output voltage;

an error amplifier comprising a differential pair configured to provide a first current signal at a first output terminal in response to a reference voltage and provide a second current signal at a second output terminal in response to a feedback voltage representing the output voltage, wherein the error amplifier is configured to provide an error signal in response to the reference voltage and the feedback voltage;

a buffer configured to provide a control signal to the control terminal of the pass element in response to the error signal;

a feed-forward loading stage coupled between the error amplifier and the second terminal of the pass element, wherein the feed-forward loading stage is configured to adjust a loading current of the pass element; and a miller compensation circuit coupled between the second terminal of the pass element and the error amplifier;

wherein the pass element is controlled in response to the control signal via a first feedback path, wherein the first feedback path starts from the second current signal flowing through the second output terminal of the differential pair, through a first current mirror coupled to the second output terminal of the differential pair, and through the buffer to the control terminal of the pass element.

20. The linear regulator circuit of claim 19, wherein the error amplifier further comprises:

a current mirror stage configured to receive the input voltage and provide the error signal to the buffer; and a second current mirror coupled to the first output terminal of the differential pair and a first terminal of the current mirror stage;

wherein the miller compensation circuit includes a capacitor coupled between the second terminal of the pass element and the first output terminal;

wherein the pass element is controlled in response to the control signal via a second feedback path, wherein the second feedback path starts from an output node through the capacitor to a control terminal of a transistor to provide the first current signal, through the current mirror stage, and through the buffer to the control terminal of the pass element.

21. The linear regulator circuit of claim 19, wherein the feed-forward loading stage comprises:

a transistor, coupled in series with the pass element, configured to adjust a loading current of the pass element in response to the first current signal.

22. The linear regulator circuit of claim 19, wherein the buffer comprises:

a first transistor having a first terminal, a second terminal and a control terminal, wherein the control terminal of the first transistor is configured to receive the error signal, and the first terminal of the first transistor is coupled to the control terminal of the pass element;

a second transistor having a first terminal, a second terminal and a control terminal, wherein the control terminal of the second transistor is coupled to the second terminal of the first transistor, and the second terminal of the second transistor is coupled to the control terminal of the pass element; and a current source, coupled in series with the first transistor, configured to provide a current signal.

23. The linear regulator circuit of claim 22, wherein the buffer further comprises:

a sensing transistor configured to sense a loading current of the pass element, and adjust a biasing current of the second transistor.

* * * * *